April 3, 1962 N. R. BELOPITOV 3,028,478

METHOD AND APPARATUS FOR REDUCING CONTACT NOISES IN ELECTRICAL DEVICES

Filed June 27, 1960

INVENTOR

Nikola R. Belopitov

BY

ATTORNEYS

United States Patent Office 3,028,478
Patented Apr. 3, 1962

3,028,478

METHOD AND APPARATUS FOR REDUCING CONTACT NOISES IN ELECTRICAL DEVICES

Nikola R. Belopitov, Sofia, Bulgaria, assignor to VEB Fernmeldewerk Arnstadt, Arnstadt Thuringia, Germany Filed June 27, 1960, Ser. No. 38,800
Claims priority, application Bulgaria Aug. 21, 1956
14 Claims. (Cl. 219—76)

This invention relates to an apparatus and method for improving the conductive properties of contact members which complete an electrical circuit by touching other members. The invention has particular reference to an apparatus for improving the conductive properties of contact members in telephone exchange systems, communication systems or the like by bonding to the surface of the contact members a highly conductive corrosive resistant material, and to a new method for producing a bond upon such contact members.

This is a continuation-in-part of copending patent application Ser. No. 679,192 filed August 20, 1957, which has since become abandoned.

The invention contemplates, in particular, securely bonding to the surface of thin copper or similar contact members such as may be used in telephone systems or the like, a coating of silver or other precious metal. Such a coating avoids the effects of corrosive deposits which may accumulate on the contact members, and serves to increase the conductivity of the contact members.

In a conventional telephone or communication system contact members are used in the process of connecting and disconnecting lines. The contact members which accomplish such connections are usually manufactured from copper or other conductive material. These contact members, due to exposure to the atmosphere, to dust or the like, readily take on a corrosive coating which reduces the conductivity of the metals and may cause generation of static charges, which upon impact with another energized contact member of the electrical circuit, will result in considerable noise and a general increase in the noise level, which in turn may tend to inhibit communication.

As is known, the passage of electric current between unsoldered and particularly through mobile contacts is often hampered or obstructed by the thin metal-oxide layer of low conductibility formed over the contact surfaces. The thickness of this layer depends on the nature of the contact metal. It is more significant in the case of the ordinary metals and less significant in the case of the precious metals. No such layer is formed on some of the latter, such as gold, platinum and others.

In addition to that, at various lengths of service of different kinds of sliding contacts, such as the two-motion selectors of automatic telephone exchanges, the switch-over units of radio transmitting and receiving equipments, the contact surfaces form a layer of low conductibility composed of the products of oxidation and mixed with metal and ordinary dust, oil, chemical compounds, and others. Both the oxide film and the impurity layer cause an increased and variable contact resistance which in turn is a source of constant noises during conversations or broadcasts.

Various methods and means are applied in order to eliminate this layer of low conductibility over the contact surfaces as well as its undesirable consequences. The contacts are lubricated by special oils. In most cases this yields negative results. Others treat the contact surfaces with emery wheels. This, however sharply reduces the length of service of the contacts, and the non-precious metal with its thick oxide layer nevertheless remains.

The so-called "fritting" of the contacts is often practiced of late. It consists of passing a constant current, which destroys the oxide layer only temporarily, during the conversation. This, however, only complicates the construction, and the results obtained are not fully satisfactory, as the "fritting" itself becomes a source of noises. There has been a proposal in recent years to use, for the purpose of "fritting," an alternating current of high frequency, 50,000 c.p.s., which is not perceptible for the human ear, but nothing is known so far about the results obtained. Therefore it becomes clear that none of the methods proposed has so far given a fully satisfactory solution to the problem.

The use of precious metals in the manufacturing of contacts has been regarded as the most radical means of reducing contact resistance and noises in the weak-current appliances. Solid contacts of precious metals are, however, very expensive. In addition to that, they are also subject to soiling by dust during operation, and they also give noises without special maintenance and careful cleaning.

It is, accordingly, an object of this invention to conveniently deposit upon a contact member a coating of precious metal characterized by its resistance to corrosion, high conductivity and avoidance of accumulation of noise producing charges on its surface.

Another object of the invention is to provide an apparatus for coating metal members with a precious metal on existing equipment such as telephone systems or the like, without disassembly of the equipment.

It is yet another object of the invention to provide a secure bond between the base material and the precious metal which clads the contact members.

It is still another object of the invention to provide an apparatus which is capable of depositing the precious metal upon the contact members of a telephone system without removal of the contact members. Since in most cases the contact members are closely spaced accomplishment of this object requires equipment which is capable of reaching into a telephone system and coating the contact members while maintaining the proper spacing between the surfaces of the contact members.

It is still another object of the invention to provide a metal coating apparatus as described above which is capable of cladding a plurality of contact member surfaces simultaneously.

It is still another object of the invention to provide a cladding apparatus which is capable of coating a contact member or the like over an arbitrarily defined surface. Such surface, for example, is the contact making surface of the contact member as compared to the entire surface of the member.

It is yet another object of the invention to provide a method and apparatus for coating a contact member whereon the thickness and the roughness of the coating may be regulated.

It is still another object of the invention to provide a coating or cladding apparatus which is capable of rapid coating of a contact member over a defined area which involves a minimum of labor.

It is another object of the invention to provide a metal cladding arrangement wherein a precious metal is bonded to a base metal contact member wherein the quantity of precious metal used may be regulated so as to prevent excess expense.

An important object of the invention is to provide a coating apparatus of the kind described which is capable of providing a secure bond between a base metal and a precious metal without preliminary chemical treatment of the surface to be coated.

In accordance with the invention there is provided means for electrically coating the base metal contact member which includes a consumable electrode positioned in the vicinity of the surface to be coated, means for vibrating said consumable electrode toward and away from the surface to be clad without touching the surface, and voltage means for producing a spark from said electrode to said base metal upon said electrode approaching said base metal and being closest to said base metal in the vibration cycle.

Other objects and many of the attendant advantages of the invention will be readily appreciated as the same becomes better understood by reference to the following detailed description when considered with the accompanying drawings, wherein.

Figure 1:
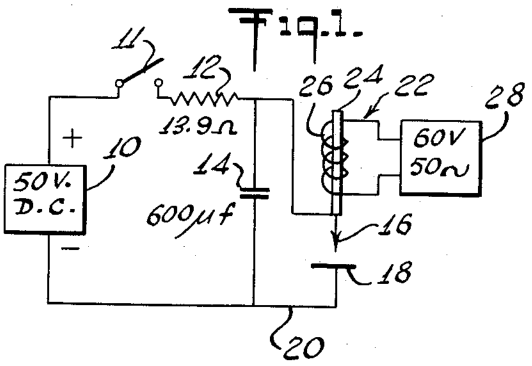
FIG. 1 is a schematic representation of the circuit which embodies the principles of the present invention.

Referring to FIG. 1, wherein the schematic diagram is illustrated, there is provided a 50 volt direct current source 10 connected electrically by way of a switch 11 to a current limiting series resistor 12 which serves to charge a capacitor 14. A consumable electrode 16 composed of the coating metal, for example silver, gold, platinum, nickel or the like, is positioned near the metal to be coated, which in the present example is a contact member 18. A contact making lead 20 serves to supply current and electrically connect the contact member 18 to the negative side of the source 10 and the capacitor 14. An electromagnetic vibrator generally designated 22 includes a movable vibration-inducing armature member 24 fixedly connected to the consumable electrode 16 and serving to vibrate the consumable electrode toward and away from the member 18, and a vibration inducing stator coil 26 which preferably surrounds the armature 24. A vibration supply 28 is connected across the stator coil 26 and produces magnetic variations. The supply 28 is preferably a 60 volt, 50 cycle A.C. supply while the capacitor in the present preferred embodiment is 600 microfarads. The value of the current limiting resistor is 13.9 ohms.

Figures 2, 4:
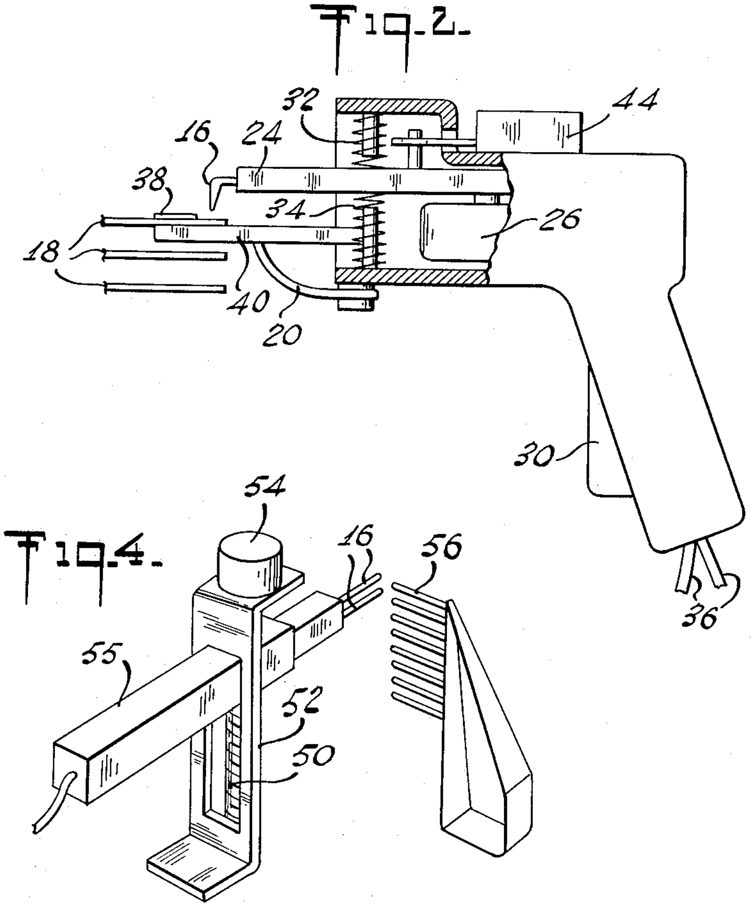
FIG. 2 illustrates an embodiment of the present invention.
FIG. 4 illustrates another apparatus which embodies the invention.

Referring to FIG. 2, the entire apparatus is encased in a pistol-grip housing which includes a trigger member 30 for operation of the switch 11. The coil 26 is fixedly mounted within the housing while the armature 24 is mounted, for vibration in response to the coil, between a pair of springs 32 and 34. The contact lead 20 is connected at one side to a line (not shown) which is the negative portion of the incoming power line 36 from the supply 10 and is clamped at its other end by suitable spring members 38 to the metal to be clad. An arm 40 supports the spring member and serves to hold the electrode 16 away from the contact member 18 at a suitable distance so that no contact will take place between the contact member 18 and the consumable electrode. When the consumable electrode is spaced away from the metal to be clad and the switch 11 is closed a current from the source 10 serves to charge the capacitor 14. The vibration supply 22 is then energized and moves the consumable electrode toward the contact making member a distance sufficiently close to effect discharge of capacitor 14 across the space between the member 18 and the electrode 16. Thus, as the electrode approaches the contact surface to be coated at a definite spacing, a spark discharge takes place. This causes a migration of material from the precious metal electrode 16 which is connected as the anode to the negatively connected contact surface 18. A pendulum magnet shown as the box 44 is connected for electromagnetic vibration from the 60 volt, 50 cycle supply and serves to move the consumable electrode horizontally so as to produce uniform cladding and deposition of metal upon the base metal as a result of the automatic horizontal motion of the electrode. The spacing between the members 18 and the electrode 16 varies from $0.833\times10^{-5}$ cm. to 0.1 cm. The minimum spacing is dependent on the voltage delivered by the capacitor 14, e.g., if the voltage is 25 volts, then the minimum spacing is $0.833\times10^{-5}$ cm.; at 50 volts it is $1.7\times10^{-5}$ cm.

The depositing time depends upon the desired thickness of the cladding layer which may vary from ten to thirty microns and can be adjusted from ten to thirty seconds in steps of five seconds each.

The following hypothesis explains the physical phenomena of the electric spark transferring metal from one electrode to the other. The electric discharge occurs between the protruding spaced parts of the anode and the cathode. A very strong current flows during the discharge. A very powerful electromagnetic field occurs as a result, and it makes the discharge channel very narrow. As a result of this the current density becomes very great and reaches hundreds of amperes per square millimeter. Due to the impulse nature of the current, the power transmitted over the surface (which is not larger than several square microns) reaches several hundreds of kilowatts. This creates a very high temperature, though one of short duration, reaching 10,000 to 20,000 degrees centigrade. This temperature not only melts but also evaporates the metal at a certain point of the electrode, in this case the contact on which we wish to deposit metal, and which remains otherwise cold on the whole. The heated vapors of the metal proceed with a great speed, as in an explosion, to the opposite electrode, which in our case is the one depositing the precious metal, and melt it. The melted metal immediately returns to the opposite direction and spreads like a small rough spot on the surface of the electrode, which in this case, it the contact member to be covered with metal. The metal is firmly linked to the surface of the contact in view of the fact that it has a very high temperature. If this process is repeated with the speed of vibration, which in this case is 100 times per second, then the speed of depositing is sufficiently great for our purposes. In view of the high temperatures involved, all oxides, dust, etc. are burnt and disappear into the atmosphere, while the surface of the contact remains with the deposited material which also contains small particles of the basic material of the contact. Since the discharges occur at accidental places, the surface deposited is not a smooth one. It is rough, possessing microscopic craters and peaks.

The degree of roughness depends on the value of the impulse current. On it also depends the thickness of the layer deposited. Contrary to expectations, the thickness of the deposited layer does not depend on the time of depositing but on the value of the impulse current. Upon increasing the time of depositing the thickness of the layer remains unchanged, the difference being that the surface then becomes more even and smoother.

Increasing the time of depositing a non-precious metal increases the oxidation of the metal deposited. No such thing is to be observed in the case of precious metals.

The fact that the electrode never touches the contact member to be coated at the moment of the electric spark discharge is of crucial importance in this invention. The contact members such as 18 are constructed of thin metallic strips and contact between the electrode and the strip during current flow may cause deformtaion of the contact member surface and may result in the electrode being fused to the contact member surface.

The order of magnitude of the capacitance 14 is also of great importance in the embodiment of FIG. 2. In order to produce a spark of the desired quality capable of developing temperatures of 10,000 to 20,000° C. at a small area on the contact member, a capacitance of some several hundred microfarads is necessary. If the capacitance is below 200 microfarads the process is unproductive. If no capacitor is used at all the process degenerates into an electric arc process and tends to deform the thin strip of contact member 18. The contact members are then heated to melting temperatures and the insulation separating several contact members would be completely ruined when the coating is applied to members in extant installations. The sparks heat the members at small points while the surrounding area remains substantially unheated.

After deposition and cladding of the contact metal, the precious metals are subjected to almost no change after being deposited while the value of the contact resistance between contacts which are cladded in this manner is decreased several hundredfold. Tests have shown by the use of a "Siemens" scaling-rotary (two-motion) line selector that the resistance of contact members deposited by means of the electric spark method and with the apparatus described above is about one milliohm immediately after cladding and varies about twelve milliohms only after the equivalent of sixty years of operation. In conventional systems which do not use cladded contact members the contact resistance of well maintained contact members varies from thirty to two hundred milliohms while poorly maintained contacts may have a resistance of as high as fifteen hundred milliohms. As a further result of the invention, the noise level during use of the members abates several hundredfold after the metals have been clad and is substantially imperceptible to the human ear.

Contact members which are clad in this manner are almost of the same high quality as contact members would be were they made of solid silver or other precious metal. The amount of precious metals used in the present apparatus by the present method is approximately .8 grams of silver for both sides of two hundred contact members of a line selector in a telephone system. Furthermore, and as an additional feature of the invention, it is possible to recoat the contact members as many times as necessary when conditions require recoating. Thus, the lifetime of a contact member is increased manyfold. Contact members of the type produced by the present invention are suitable for long distance use as well as local use, whereas contact members of the base metal such as copper are conventionally used only for local use.

The invention further makes feasible the use of gold coated contact members which are essentially superior to silver coated contact members. The formation of silver sulphite has a tendency to prevent good contact between contact members and is itself inferior to gold. Because of the minute quantity of cladding metal deposited upon the base metal by means of the present method and apparatus, the use of the less corrosive gold is feasible.

It will also be noted that the present apparatus is susceptible to use during manufacture of contacts as well as after the contact members have been installed. The small size of the operating parts enables an operator to conveniently coat almost any material in any position.

Figure 3:
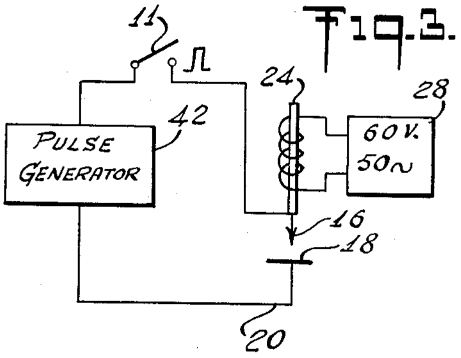
FIG. 3 is a schematic representation of the circuit of another embodiment of the invention.

Another embodiment of the invention is shown in FIG. 3 wherein a pulse generator 42 is provided in place of the D.C. source 10 and the capacitor 14, for furnishing narrow rectangular direct current pulses of $\leq 200$ microseconds having peaks of 25 volts at a pulse repetition rate of up to 800 cycles per second. The pulses are capable of producing sparks while the consumable electrode is vibrated. It is, however, within the scope of the invention to hold the electrode at a fixed distance from the material to be coated.

In another embodiment of the invention shown in FIG. 4, an automatic control system is used. A vertical feed screw 50 is mounted within a bracket 52 and is controlled by a feed motor 54 which is also mounted on the bracket. A movable housing 55 is controlled with respect to its vertical position by the feed screw 50 and carries a pair of electrical systems such as that of FIG. 2, including the vibrator, while a pair of electrodes 16 each projects therefrom. A plurality of vertically aligned contact members 56 are positioned to be coated by the electrodes and the feed screw operates to intermittently advance the electrodes to successive pairs of contact members 56. Means not shown swing the electrodes horizontally to avoid impact with the contact members 56 as the electrodes advance vertically. It should of course be understood that the use of the circuit of FIG. 3 may be applied to this embodiment and that such use of FIG. 3 is within the scope of this embodiment of the invention.

For coating contact members in rotary systems, means are provided for moving the precious metal electrode from contact to contact and vibrating depositing precious metal on the contact surface. The frequency and amplitude of vibration are determined in the system by the capacitance such as 14. In the transfer of metal during the sparking process the thickness of the layer is in part dependent upon the current which passes through the consumable electrode. When the current is .1 ampere, the layer produced is thin and slightly rough. At 5 amperes it is thicker, approximately 50 microns, and is comparatively rough.

It should be understood, of course, that the foregoing disclosure relates only to preferred embodiments of the invention and that it is intended to cover all changes and modifications of the examples described, which do not constitute departures from the spirit and scope of the invention as set forth in the appended claims.

What is claimed is:

1. A process for improving the conductive properties of the surface of a contact member by electro-erosion, comprising the steps of positioning a consumable anode composed of a metal more corrosion-resistant and more conductive than said contact member at a predetermined distance from said contact member connected as a cathode, vibrating said anode toward and away from said cathode without touching said surface, biasing the vibration of said anode so as to restrain said vibration to predetermined limits, applying a high momentary potential across said anode and said cathode to cause spark discharge between said anode and said cathode, whereby particles from said anode become deposited on the surface of said contact member.

2. A process according to claim 1, wherein said biasing is accomplished within the distance range of $0.833 \times 10^{-5}$ to $1.7 \times 10^{-5}$ centimeters.

3. A process according to claim 1, wherein said vibrating is performed electromagnetically.

4. A process according to claim 1, wherein said biasing is performed by urging said anode resiliently towards a central position.

5. A process according to claim 1 wherein said potential application is for a duration of around 200 microseconds and with a repetition rate of at least 300 cycles per second with peaks of substantially 25 volts.

6. A process according to claim 1, further comprising translating said anode in a direction substantially perpendicular to its longitudinal extension for treating successive contact members.

7. A process according to claim 6, further comprising swinging said anode out and into engagement with said contact member while performing said translating.

8. An apparatus for improving the conductive properties of the surface of a contact member by electro-erosion, comprising, in combination, a housing, a consumable anode, composed of a metal more corrosion-resistant and more conductive than said contact member, pivotally secured to said housing and adapted to be spaced with its free end at a predetermined distance from said contact member, so as to form a gap between said anode and said contact member, vibrating means in said housing for periodically reciprocating said anode toward and away from said contact member without touching the same, a spacing member rigidly secured to said housing and protruding therefrom substantially parallel with said anode and adapted for engagement and electrical contact with the side of said contact member opposite said anode so as to secure a predetermined value of said gap, means to apply a high momentary potential across said anode and said contact member, whereby a spark discharge will occur between said anode and said contact member, so that particles from said anode become deposited on the surface of said contact member.

9. An apparatus according to claim 8, further comprising a high-value capacitor connected across said anode and said spacing member for increasing said potential and decreasing the duration of said spark discharge.

10. An apparatus according to claim 8, further comprising an armature loosely attached with one end to said housing, said anode being attached to the other end of said armature for pivotal movement therewith, a pair of biasing members arranged on said housing on opposite sides of said armature, and said vibrating means being positioned in the proximity of said armature.

11. An apparatus according to claim 10, wherein said vibrating means comprises an electromagnetic coil placed adjacent to and acting upon said armature.

12. An apparatus according to claim 8, further comprising a second anode in said housing supported, electrically connected and operating substantially identically to said first anode, and a second spacing member.

13. An apparatus according to claim 12, further comprising means for translating said anodes in a direction substantially perpendicular to their longitudinal extension for treating successive pairs of contact members.

14. An apparatus according to claim 13, further comprising means for swinging said anodes out and into engagement with said contact members while said translating means is in operation.

References Cited in the file of this patent

UNITED STATES PATENTS

| | | |
|---|---|---|
| 434,133 | Kookogey | Aug. 12, 1890 |
| 2,273,819 | Cooke et al. | Feb. 24, 1942 |
| 2,383,382 | Harding | Aug. 21, 1945 |
| 2,549,360 | Barbeck | Apr. 17, 1951 |
| 2,779,857 | Mironoff | Jan. 29, 1957 |
| 2,796,509 | Blake | June 18, 1957 |
| 2,871,410 | Matulaitis | Jan. 27, 1959 |

FOREIGN PATENTS

| | | |
|---|---|---|
| 808,002 | Great Britain | Jan. 28, 1959 |